Patented Mar. 27, 1928.

1,663,950

UNITED STATES PATENT OFFICE.

WILHELM NEELMEIER, OF LEVERKUSEN, NEAR COLOGNE, AND HANS SCHNEIDER, OF STAMMHEIM, NEAR COLOGNE, GERMANY, ASSIGNORS TO GRASSELLI DYESTUFF CORPORATION, OF NEW YORK, N. Y., A CORPORATION OF DELAWARE.

RED DISAZO DYES FOR COTTON PRINTING.

No Drawing. Application filed March 23, 1925, Serial No. 17,772, and in Germany April 4, 1924.

Our invention resides in red disazo dyes which are particularly useful for the printing of cotton goods in various red shades of exceedingly good fastness properties.

These dyes are 1-hydroxy-2-carboxy-benzol-4-azo-benzol-3-azo-1-acidyl-amino-8-hydroxy-naphthalene sulfonic acids of the general formula

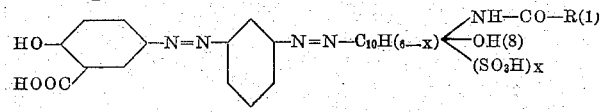

in which X stands for one of the numerals 1 and 2.

It is known that diazotized amino-benzol-azo-salicylic acids can be combined with naphthol sulfonic acids; the resulting dyestuffs dye, however, on chrome mordanted cotton goods weak and unpleasant brown shades which, in no way, can be compared with the bright and fast red shades obtained with our new products.

Our preferred process for producing these new dyestuffs is to couple diazotized amino-benzol-meta-azo-salicylic acids in alkaline solution with peri-acidyl-amino-naphthol sulfonic acids. The amino-benzol-meta-azo-salicylic acids can be produced by combining diazotized meta-nitranilines with salicylic acid compounds and reducing the nitro group or by diazotizing mono-acidyl-meta-phenylene-diamines, coupling with salicylic acid compounds and saponifying the acidyl group.

Substituted meta-phenylene-diamine compounds such as meta-phenylene-diamine sulfonic acid, meta-toluylene-diamine, meta-toluylene-diamine sulfonic acids, etc., and instead of salicylic acids, cresotinic acid, salicylic sulfonic acids, etc., can be used in the production of our new type of disazo dyes. The group of peri-acidyl-amino-naphthol sulfonic acids mentioned above includes amongst others, products such as 1-acetyl-amino-8-naphthol-4-sulfonic acid, 1-acetyl-amino-8-naphthol-4-6-di-sulfonic acid, 1-benzol-amino-8-naphthol-3-6-di-sulfonic acid, 1-acetyl-amino-8-naphthol-3-6-di-sulfonic acid.

Our new dyestuffs are in the form of their alkali metal salts generally dark red powders, soluble in water with from yellowish-red to bluish-red colors, soluble in concentrated sulfuric acid with red colors and when reduced as, for instance, with zinc and hydrochloric acid, they yield an amino-salicylic acid compound, a meta-di-amino-benzol compound and an amino-1-acidyl-amino-8-naphthol sulfonic acid. Printed on cotton with chromium acetate they produce various red shades of excellent fastness to chlorine, washing and light.

In order to further illustrate our invention, the following examples are given, the parts being by weight.

*Example 1.*—259 parts meta-amino-benzol-azo-salicylic acid are dissolved in hot water and 115 parts caustic soda 40° Bé. added and cooled to about 5° C; 70 parts sodium nitrite dissolved in about 150 parts water are then added and the mixture run into 350 parts concentrated hydrochloric acid, cooled with plenty of ice. The solution of meta-diazo-benzol-azo-salicylic acid obtained in this way is run into an ice-cold solution of 405 parts 1-acetyl-amino-8-naphthol-4-6-di-sulfonate of sodium dissolved in 2000 parts water to which 200 parts soda ash are added. The coupling is finished in a few hours, the dyestuff is salted out, filtered, washed and dried. It is a dark red powder soluble in water with a yellowish-red color, soluble in concentrated sulfuric acid with the same color. Reduced with zinc and hydrochloric acid, meta-phenylene-diamine, para-amino-salicylic acid and amino-1-acetyl-amino-8-naphthol-4-6-di-sulfonic acid are obtained. This dyestuff has most probably the formula

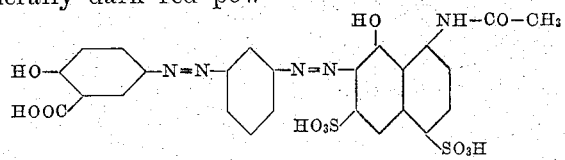

Printed on cotton with chromium acetate, yellowish-red shades are obtained which are exceedingly fast to chlorine, washing and light.

*Example 2.*—274 parts oxalyl-2-4-toluylene-diamine-5-sulfonic acid are diazotized in the usual way and the diazo compound solution run into an ice-cold solution of 138 parts salicylic acid in 1000 parts water and 200 parts soda ash. The coupling temperature is held at 0° C. and the coupling run for 10 to 12 hours. The mono-azo-compound is salted out, filtered off and washed out. The paste is then suspended in 400 parts 30% caustic soda and 2000 parts water and boiled for about ½ an hour which saponifies the oxalyl group. The excess caustic soda is neutralized with hydrochloric acid and the sulfo-methyl-meta-amino-benzol-azo-salicylic acid salted out, filtered and dried. It is a yellowish-brown powder soluble in water with yellow color which does not change by addition of mineral acid.

351 parts of this sulfo-methyl-meta-amino-benzol azo-salicyclic acid are now dissolved in hot water with the requisite amount of caustic soda cooled to about 5° C. and 70 parts sodium nitrite added. The solution is then run into ice-cold hydrochloric acid, the diazotization proceeds quickly and the so-obtained diazo solution is now run into an ice-cold solution of 405 parts 1-acetyl-amino-8-naphthol-3-6-di-sulfonate of sodium in 2000 parts of water to which 200 parts of soda ash are added. The coupling is finished after about 5 hours, the color is then salted out, filter-pressed, washed and dried. It is a dark red powder soluble in water with a bluish-red color, soluble in concentrated sulfuric acid with a bluish-red color. Reduced with zinc and hydrochloric acid, 2-4-meta-toluylene-diamine-5-sulfonic acid, para-amino-salicyclic acid and 7-amino-1-acetyl-amino-8-naphthol-3-6-disulfonic acid are obtained. The new dyestuff has most likely the following formula

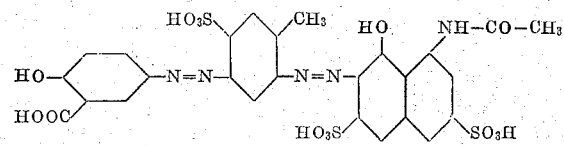

Printed with chromium acetate on cotton goods, a bluish-red exceedingly fast to chlorine, washing and light is obtained.

We claim:—

1. As new products disazo dyes having most probably the general formula

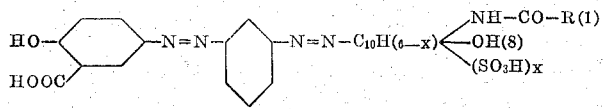

in which X stands for one of the numerals 1 and 2 obtainable by combining diazo-benzol-meta-azo-salicylic acid compounds with peri-acidyl-amino-naphthol sulfonic acid, being in form of their alkali metal salts dark red powders soluble in water and in concentrated sulfuric acid with red colors, yielding by reduction with zinc and hydrochloric acid an amino-salicylic acid compound, a meta-diamino-benzol compound and an amino-1-acidyl-amino-8-naphthol sulfonic acid and yielding when printed on cotton with chromium acetate fast red shades.

2. As new products disazo dyes having most probably the general formula

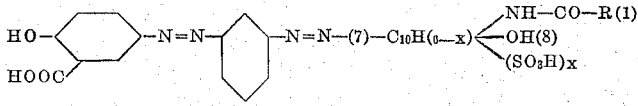

in which X stands for one of the numerals 1 and 2 obtainable by combining diazo-benzol-meta-azo-salicylic acid compounds in alkaline solution with peri-acidyl-amino-naphthol sulfonic acids, being in form of their alkali metal salts dark red powders soluble in water and in concentrated sulfuric acid with red colors, yielding by reduction with zinc and hydrochloric acid an amino-salicylic acid compound, a meta-diamino-benzol compound and a 7-amino-1-acetyl-amino-8-naphthol sulfonic acid and yielding when printed on cotton with chromium acetate fast red shades.

3. As a new product the disazo dye having most probably the formula

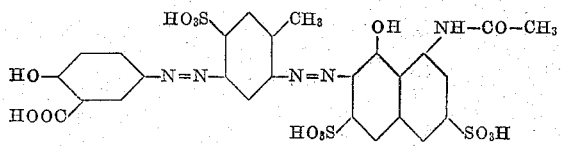

obtainable by combining in alkaline solution 2-diazo-1-methyl-benzol-5-sulfonic acid-4-azo-salicylic acid with 1-acetyl-amino-8-naphthol-3-6-di-sulfonic acid, being in form of its alkali metal salt a dark red powder soluble in water and in concentrated sulfuric acid with a bluish-red color, yielding by reduction with zinc and hydrochloric acid, para-amino-salicylic acid, 2-4-di-amino-toluol-5 sulfonic acid and 7-amino-1-acetyl-amino-8-naphthol-3-6-di-sulfonic acid and yielding when printed on cotton with chromium acetate bluish-red shades of excellent fastness to chlorine, washing and light.

In testimony whereof we have hereunto set our hands.

WILHELM NEELMEIER.
HANS SCHNEIDER.